United States Patent Office 3,424,708
Patented Jan. 28, 1969

3,424,708
MASS-COLORATION OF SYNTHETIC LINEAR POLYESTERS
Francis Bowman, Albert Charles Cooper, and Francis Irving, Manchester, England, assignors to Imperial Chemical Industries Limited, London, England, a corporation of Great Britain
No Drawing. Continuation-in-part of application Ser. No. 459,928, May 28, 1965. This application Nov. 29, 1967, Ser. No. 686,697
Claims priority, application Great Britain, June 8, 1964, 23,599/64; Oct. 16 1964, 42,323/64; May 20, 1965, 21,408/65, 21,409/65
U.S. Cl. 260—40
Int. Cl. C08g 53/04, 51/66, 17/00

6 Claims

ABSTRACT OF THE DISCLOSURE

Process for the mass-coloration of polyesters by carrying out the polymerisation of the polyester-forming components in the presence of at least one polycyclic dyestuff which contains one or more anilino or phenylthio groups substituted by a carboxylic acid ester group.

This invention relates to a coloration process, and more particularly to a process for the mass coloration of synthetic linear polyesters, particularly polyethylene terephthalate.

This application is a continuation in-part of our application Ser. No. 459,928, which was filed in the U.S. Patent Office on May 28, 1965. and now abandoned.

In order for a colouring matter to be completely satisfactory for use in the mass coloration of synthetic linear polyesters it must fulfil the following requirements:

(1) It must be capable of withstanding the high temperature of the molten material (290° C.).

(2) It must not have a high volatility, otherwise it may sublime during the spinning process, causing irregular coloration, and fabric subsequently subjected to pleating operations may lose colour strength or cause marking of adjacent fabric.

(3) It must have high fastness to light, and to the action of dry-cleaning solvents, perspiration and bleaches.

It has been found that a class of polycyclic dyestuff compounds is particularly valuable for the mass coloration of synthetic linear polyesters.

According to the invention there is provided a process for the mass coloration of synthetic linear polyesters which comprises effecting the polymerisation of the polyesters in the presence of one or more dyestuffs of the formula:

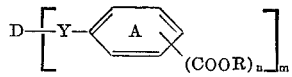

wherein

D is a dyestuff radical which is free from sulphonic acid groups and which is selected from the class consisting of anthraquinone, anthrapyridone, isothiazoloanthrone, anthrapyrimidine, anthrapyrimidone and phthaloylacridone dyestuff radicals;

Y, which is attached to a carbon atom of a benzene ring present in D, is selected from the class consisting of —S— and —NH—;

R represents a radical selected from the class of alkyl containing 1 to 6 carbon atoms, octyl, decyl, dodecyl, cyclohexyl, hydroxyalkyl containing 1 to 4 carbon atoms and alkyl groups containing 1 to 4 carbon atoms which are substituted with alkoxy groups containing 1 to 4 carbon atoms;

$n$ is a positive integer not exceeding 2;
$m$ is a positive integer not exceeding 4;
and any further substituents on the benzene ring A are chlorine atoms.

It is preferred that $n$ represent 1; and that the —COOR group is attached to the benzene ring A in ortho position to the bridging atom or group represented by Y. It is further preferred that D represents an anthraquinone dyestuff radical.

If desired the dyestuff radical can contain further substituents, other than sulphonic acid groups, which are commonly present in such dyestuff radicals, for example chlorine or bromine atoms, carboxylic acid groups, lower alkyl radicals such as the methyl radical, lower alkoxy radicals such as the methoxy radical, hydroxy groups, amino groups, N-lower alkylamino groups such as methylamino, ethylamino, dimethylamino and diethylamino groups, and acylamino groups such as acylamino groups derived from lower aliphatic carboxylic acids such as acetylamino and propionylamino groups or from monocyclic aryl carboxylic acids such as the benzoylamino group.

As examples of the alkyl radicals represented by R there may be mentioned methyl, ethyl, n-propyl, isopropyl, n-butyl, tert.-butyl, n-amyl and n-hexyl radicals. As examples of the hydroxyalkyl radicals represented by R there may be mentioned β-hydroxyethyl, β- or γ-hydroxypropyl and δ-hydroxybutyl radicals; and as examples of the alkoxyalkyl radicals represented by R there may be mentioned β-methoxyethyl, β-ethoxyethyl, β- or γ-ethoxypropyl and δ-propoxybutyl radicals.

Throughout the specification the terms "lower alkyl" and "lower alkoxy" are used to denote alkyl and alkoxy radicals respectively containing from 1 to 4 carbon atoms.

The dyestuffs used in the process of the invention may themselves be obtained by reacting a dyestuff compound of the formula D—(Cl)$_m$ with a compound of the formula

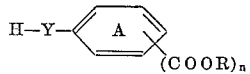

or by reacting a compound of the formula D—(YH)$_m$ with a compound of the formula

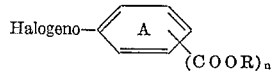

or by esterifying the corresponding carboxylic acids.

As specific examples of dyestuffs which can be used in the process of the invention there may be mentioned 1:5-bis(o-carbomethoxyanilino)anthraquinone
1:8-bis-(o-carboethoxyanilino)anthraquinone
1:4-bis(o-carbomethoxyanilino)anthraquinone
1:5-bis(m-carbomethoxyanilino)anthraquinone
1:5-bis(p-carboethoxyanilino)anthraquinone
1:5-bis(o-ethoxycarbonylanilino)anthraquinone
1:5-bis-(o-octyloxycarbonylanilino)anthraquinone
1:5-bis-[o-(β-ethoxyethoxycarbonyl)anilino]anthraquinone
1:8-bis-(p-carbomethoxyanilino)anthraquinone
1:8-bis-(m-carbomethoxyanilino)anthraquinone
1:4-bis-(p-carbomethoxyanilino)anthraquinone
1:4-bis-(m-carboethoxyanilino)anthraquinone
1:5-bis-(2′:5′-dicarbomethoxyanilino)anthraquinone
1:5-bis-(3′:5′-dicarbomethoxyanilino)anthraquinone
1:5-bis-(o-dodecyloxycarbonylanilino)anthraquinone 1:5-bis-(o-cyclohexyloxycarbonylanilino)anthraquinone
3:7-dibromo-1:5-bis-(o-carbomethoxyanilino)anthraquinone.

The process of the invention can be conveniently carried out by heating a mixture of the polymer forming components, such as terephthalic acid or dimethylterephthalate and a glycol such as ethylene glycol, containing one or more of the said dyestuffs, until polymerization is complete. The coloured polymer so formed can then be shaped into articles or spun into fibres by known techniques. Alternatively the polymer forming components can be heated together to form a low-molecular weight polymer, the dyestuff is then added and heating continued until the required degree of polymerization is obtained.

As examples of coloured synthetic linear polyesters which can be obtained by the process of the invention there may be mentioned polyesters which are obtained by the reaction of terephthalic acid or an ester, in particular the methyl ester, thereof with glycols of the formula HO—$(CH_2)_x$—OH wherein $x$ is an intger of from 2 to 10, or with 1:4-di(hydroxymethyl)cyclohexane. The term synthetic linear polyesters also includes copolyesters based on the said polyesters; such copolyesters being obtained by replacing a portion of the terephthalic acid by another dicarboxylic acid or by a hydroxycarboxylic acid, and/or replacing a portion of the glycol by a different glycol.

The coloured synthetic linear polyesters produced by the process of the invention have good fastness to washing, pressure steaming, acid cross dyeing, perspiration, rubbing after steaming, dry heat treatments such as are used in pleating operations, and to light. It is also found that the colorations can be produced in heavy depths of shade, without impairing the properties of the synthetic linear polyesters or fibres derived therefrom.

A class of the dyestuffs which is especially valuable for use in the process of the invention comprises the dyestuffs of the formula:

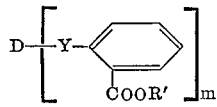

wherein D, Y and $m$ have the meanings stated, and R' represents a lower alkyl radical. Preferably Y represents the —NH— groups.

A second class of the dyestuffs which is especially valuable in the process of the invention comprises the dyestuffs of the formula:

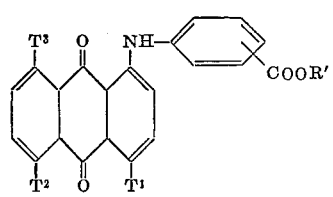

wherein $T^1$, $T^2$ and $T^3$ each independently represents a hydrogen atom or a group of the formula:

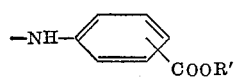

In this class the —COOR' group is preferably attached to the benzene ring in ortho position to the —NH— group.

Such dyestuffs when used in the process of the invention yield red, violet or green shades of excellent fastness properties.

The invention is illustrated but not limited by the following examples in which the parts are by weight.

EXAMPLE 1

100 parts of dimethyl terephthalate, 71 parts of ethylene glycol, 0.05 part of manganese acetate and 0.04 part of phosphorous acid are stirred together for 4 hours at 197° C., during which time about 33 parts of methanol distil off from the mixture. To this mixture is added 3 parts of 1:5-bis-(o-carbomethoxyanilino)anthraquinone which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn into fibres. The fibres so obtained are coloured a deep red shade possessing excellent fastness properties.

EXAMPLE 2

100 parts of dimethyl terephthalate, 71 parts of ethylene glycol, 0.05 part of manganese acetate, 0.04 of phosphorous acid and 3 parts of 1:5-bis(o-carbomethoxyanilino)anthraquinone are stirred for 4 hours at 197° C. during which time about 33 parts of methanol are distilled off. The temperature of the mixture is then increased to 277° C., the pressure is reduced to 0.3 mm. of mercury and heating is continued under these conditions for a further 6 hours whilst the excess ethylene glycol is distilled off. The mixture is then formed into filaments which are subsequently drawn out into fibres. The resulting fibres are coloured a deep red shade possessing excellent fastness properties.

EXAMPLE 3

100 parts of dimethyl terephthalate, 71 parts of ethylene glycol and 0.05 part of manganous acetate are stirred together for 4 hours at 197° C. during which time about 33 parts of methanol distil off from the mixture. To this mixture is then added 0.04 part of phosphorous acid, 0.08 part of antimony trioxide and 3 parts of 1:5-bis-(o-carbomethoxyanilino)anthraquinone which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn out into fibres. The fibres so obtained are coloured a deep red shade possessing excellent fastness properties.

EXAMPLE 4

100 parts of dimethyl terephthalate, 71 parts of ethylene glycol, 0.05 part of manganous acetate and 3 parts of 1:5-bis(o-carbomethoxyanilino)anthraquinone are stirred for 4 hours at 197° C. during which time about 33 parts of methanol are distilled off, 0.04 part of phosphorous acid and 0.08 part of antimony trioxide are then added, the temperature of the mixture is then increased to 277° C., the pressure is reduced to 0.3 mm. of mercury and heating is continued under these conditions for a further 6 hours whilst the excess ethylene glycol is distilled off. The mixture is then formed into filaments which are subsequently drawn out into fibres. The resulting fibres are coloured a deep red shade possessing excellent fastness properties.

In place of the 1:5-bis(o-carbomethoxyanilino)-anthraquinone used in the above examples there is used equivalent amounts of the corresponding ethyl, n-propyl, n-butyl, n-amyl, hexyl, octyl, decyl, dodecyl, β-hydroxyethyl or β-ethoxyethyl esters when similar results are obtained.

In place of the 1:5-bis(o-carbomethoxyanilino)-anthraquinone used in Examples 1 to 4 there are used corresponding amounts of the dyestuffs listed in the second column of the following table whereby the synthetic linear polyesters are coloured in the shades listed in the third column of the table.

EXAMPLE

| | Dyestuff | Shade |
|---|---|---|
| 5 | 1:5-bis(o-cyclohexyloxycarbonylanilino)anthraquinone. | Red. |
| 6 | 1:8-bis-(o-carbomethoxyanilino)anthraquinone. | Bluish-red. |
| 7 | 1:4-bis-(o-carbomethoxyanilino)anthraquinone. | Bluish-green. |
| 8 | 1:4-bis-(m-carbomethoxyanilino)anthraquinone. | Greenish-blue. |
| 9 | 1:4-bis-(p-carboethoxyanilino)anthraquinone. | Green. |
| 10 | 1:4:5:8-tetra-(o-carbomethoxyanilino)anthraquinone. | Do. |
| 11 | 1:5-bis-(o-carbomethoxyphenylthio)anthraquinone. | Yellow. |
| 12 | 1:8-bis-(o carbomethoxyphenylthio)anthraquinone. | Do. |
| 13 | 1:3-bis-(o-carbomethoxyphenylthio)anthraquinone. | Greenish-yellow. |
| 14 | 6-(o-carbomethoxyanilino)-3-methyl-1':9'-anthrapyridone. | Carmine. |
| 15 | 1-methylamino-4-(o-carbomethoxyanilino)anthraquinone. | Blue. |
| 16 | 1:5-bis[2:5-di(carbomethoxy)anilino]anthraquinone. | Pink. |
| 17 | 1:5-bis(o-carbomethoxyanilino)-4:8-dihydroxyanthraquinone. | Deep blue. |
| 18 | 1:benzoylamino-4:5-bis-(o-carbomethoxyanilino)anthraquinone. | Blue. |
| 19 | 1:4:5-tri-(o-carbomethoxyanilino)anthraquinone. | Green. |
| 20 | 5-(o-carbomethoxyanilino)-1':9'isothiazoloanthrone | Reddish-yellow. |
| 21 | 7:(o-carbomethoxyanilino)-3':4'-phthaloylacridone. | Crimson. |
| 22 | 1:benzoylamino-4-(o-carbomethoxyphenylthio)anthraquinone. | Scarlet. |
| 23 | 1:8-bis-(o-carbomethoxyanilino)-4:5-dihydroxy-anthraquinone. | Blue. |

The 1:4-bis-(o-carbomethoxyanilino)anthraquinone used above was obtained by heating a mixture of 1:4-diamino-anthraquinone, methyl o-chlorobenzoate, sodium carbonate, anhydrous sodium acetate, cuprous chloride and nitrobenzene at the boil for 18 hours, and isolating the product by steam distillation or by diluting the reaction mixture with benzene. The 1:4-bis-(p-carboethoxyanilino)anthraquinone was obtained by the same method but substituting ethyl p-bromobenzoate for methyl o-chlorobenzoate. This method may also be used to obtain other esters starting from the appropriate intermediates. Alternatively, 1:5-bis-(o-carboxyanilino)anthraquinone was converted to the acid chloride by heating it in a suspension of dry toluene with thionyl chloride in presence of a small amount of pyridine, isolating the acid chloride and reacting it with methanol, ethanol, β-methoxyethanol, octyl alcohol or other alcohol to obtain the required ester. Alternatively, the esters may also be obtained by reacting the corresponding halogen anthraquinone derivatives with the appropriate esters of aminobenzoic acid in a solvent such as nitrobenzene and in the presence of an acid-binding agent such as sodium carbonate and a copper catalyst such as cuprous chloride.

What we claim is:

1. Process for the mass coloration of synthetic linear polyesters which comprises using as colouring matter at least one dyestuff of the formula:

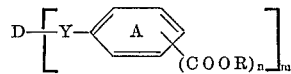

wherein

D is a dyestuff radical which is free from sulphonic acid groups and which is selected from the class consisting of anthraquinone, anthrapyridone, isothiazoloanthrone, anthrapyrimidine, anthrapyrimidone and phthaloylacridone dyestuff radicals;

Y, which is attached to a carbon atom of a benzene ring present in D, is selected from the class consisting of —S— and —NH—;

R represents a radical selected from the class consisting of alkyl containing 1 to 6 carbon atoms, octyl, decyl, dodecyl, cyclohexyl, hydroxyalkyl containing 1 to 4 carbon atoms and alkyl groups containing 1 to 4 carbon atoms which are substituted with alkoxy groups containing 1 to 4 carbon atoms;

$n$ is a positive integer not exceeding 2;

$m$ is a positive integer not exceeding 4;

and any further substituents on the benzene ring A are chlorine atoms;

and wherein the dyestuff is mixed with the polyester-forming components and the resulting mixture is heated to effect polymerisation.

2. Process as claimed in claim 1 wherein the dyestuff is a dyestuff of the formula:

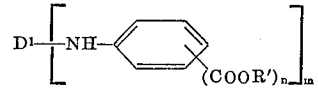

wherein $D^1$ is an anthraquinone dyestuff radical; $R'$ is an alkyl radical containing 1 to 4 carbon atoms; $n$ is a positive integer not exceeding 2; and $m$ is a positive integer not exceeding 4.

3. Process as claimed in claim 1 wherein the dyestuff is a dyestuff of the formula:

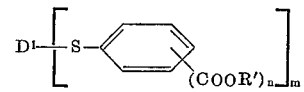

wherein $D^1$ is an anthraquinone dyestuff radical; $R^1$ is an alkyl radical containing 1 to 4 carbon atoms; $n$ is a positive integer not exceeding 2; and $m$ is a positive integer not exceeding 4.

4. Process for the mass coloration of synthetic linear polyesters which comprises using as colouring matter at least one dyestuff of the formula:

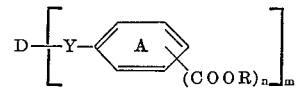

wherein

D is a dyestuff radical which is free from sulphonic acid groups and which is selected from the class consisting of anthraquinone, anthrapyridone, isothiazoloanthrone, anthrapyrimidine, anthrapyrimidone and phthaloylacridone dyestuff radicals;

Y, which is attached to a carbon atom of a benzene ring present in D, is selected from the class consisting of —S— and —NH—;

R represents a radical selected from the class consisting of alkyl containing 1 to 6 carbon atoms, octyl, decyl, dodecyl, cyclohexyl, hydroxyalkyl containing 1 to 4 carbon atoms and alkyl groups containing 1 to 4 carbon atoms which are substituted with alkoxy groups containing 1 to 4 carbon atoms;

$n$ is a positive integer not exceeding 2;

$m$ is a positive integer not exceeding 4;

and any further substituents on the benzene ring A are chlorine atoms;

and wherein the polyester-forming components are partially polymerised, the dyestuff is added, and the mixture is then further polymerised.

5. Process as claimed in claim 4 wherein the dyestuff is a dyestuff of the formula:

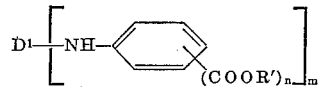

wherein $D^1$ is an anthraquinone dyestuff radical; $R'$ is an alkyl radical containing 1 to 4 carbon atoms; $n$ is a positive integer not exceeding 2; and $m$ is a positive integer not exceeding 4.

6. Process as claimed in claim 4 wherein the dyestuff is a dyestuff of the formula:

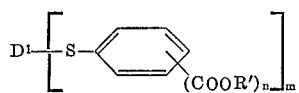

wherein $D^1$ is an anthraquinone dyestuff radical; $R'$ is an alkyl radical containing 1 to 4 carbon atoms; $n$ is a positive integer not exceeding 2; and $m$ is a positive integer not exceeding 4.

References Cited

UNITED STATES PATENTS

| | | |
|---|---|---|
| 3,097,909 | 7/1963 | Rhyner et al. _____ 260—376 |
| 3,104,233 | 9/1963 | Altermatt. |
| 3,228,780 | 1/1966 | Grelat. |

FOREIGN PATENTS

| | | |
|---|---|---|
| 891,774 | 3/1962 | Great Britain. |

MORRIS LIEBMAN, *Primary Examiner.*

L. T. JACOBS, *Assistant Examiner.*